(12) United States Patent
Stenberg

(10) Patent No.: US 7,177,654 B2
(45) Date of Patent: Feb. 13, 2007

(54) APPARATUS AND METHOD FOR DELIVERING PAGING MESSAGES

(75) Inventor: Timo Mauritz Stenberg, Vantaa (FI)

(73) Assignee: EADS Secure Networks Oy, Helsinki (FI)

( * ) Notice: Subject to any disclaimer, the term of this patent is extended or adjusted under 35 U.S.C. 154(b) by 555 days.

(21) Appl. No.: 10/279,015

(22) Filed: Oct. 24, 2002

(65) Prior Publication Data

US 2004/0192257 A1 Sep. 30, 2004

(51) Int. Cl.
*H04Q 7/20* (2006.01)

(52) U.S. Cl. .................. 455/458; 455/445; 455/515

(58) Field of Classification Search ............... 455/458, 455/426.1, 448, 454, 515, 67.11, 466, 445, 455/422.1, 403, 517, 518, 519, 521, 404.1, 455/414.1; 340/7.21, 7.2, 7.32, 7.43, 7.44, 340/825; 370/321, 337, 347, 442, 445, 220, 370/335, 342, 441

See application file for complete search history.

(56) References Cited

U.S. PATENT DOCUMENTS 5,511,072 A * 4/1996 Delprat .................. 370/337
6,014,375 A * 1/2000 Janky .................... 370/347
6,188,882 B1 * 2/2001 Tarkiainen et al. ...... 455/404.1
2002/0161841 A1 * 10/2002 Kinnunen ................ 370/260

* cited by examiner

*Primary Examiner*—Jean Gelin
(74) *Attorney, Agent, or Firm*—Squire, Sanders & Dempsey, LLP.

(57) ABSTRACT

A radio system comprising a switching and management infrastructure arranged to deliver voice and data between a plurality of communicating parties, and a mobile station. Said radio system comprises a multiplicity of traffic channels, each traffic channel being associated with a unique coding scheme. The switching and management infrastructure is arranged to receive a plurality of paging messages from a plurality of communicating parties, and to combine the paging messages received during a pre-defined time period into a paging frame comprising a multiplicity of address data blocks for identifying the mobile station(s) for which the paging frame comprises a paging message. At least one of the traffic channels of the radio system is dedicated to delivery of downlink paging messages, and associated with a coding scheme that comprises at least one error protection algorithm. The mobile stations are arranged to receive data on said traffic channel, and to extract information addressed to them based on the address blocks of the paging frame.

16 Claims, 3 Drawing Sheets

Fig. 3
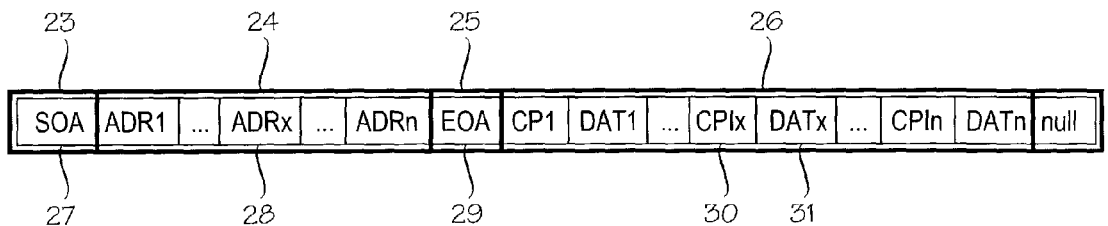
Fig. 4
← 1 block = 24 bits           n = 333
← L = 1019 bits →
Fig. 5
| FIELD | bitfield | U | ff | payload | BCH |
|---|---|---|---|---|---|
|  | length | 1 | 2 | 24 | 5 |
| SOA |  | 0 | 11 | 011110011110000111100001 | 11100 |
| ADR |  | 1 | 00 | any | any |
| EOA |  | 0 | 10 | 111111111111111111111111 | fixed |
| CPI |  | 1 | 01 | any | any |
| DAT |  | 0 | 10 | any | any |
| null |  | 1 | 00 | 110010101010101010101010 | 10101 |
Fig. 6
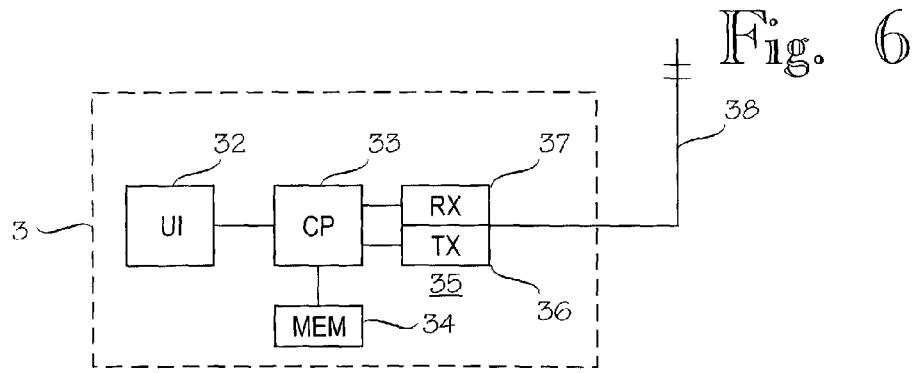

APPARATUS AND METHOD FOR DELIVERING PAGING MESSAGES

FIELD OF THE INVENTION

The present invention relates to a radio system, and more particularly to a solution for delivery of paging messages in a radio system for voice and data communication.

BACKGROUND OF THE INVENTION

In public safety environment, the resources available are typically optimised so that normal day-to-day operations can be carried out by the personnel on duty. In addition, the organisations need to be prepared to call in a number of standby personnel, which can be activated with only a short delay in cases of unexpected increase in the need for resources, e.g. major accidents or other incidents.

The calling in of standby personnel has typically been a very organisation specific procedure involving lists of backup numbers of fixed lines or commercial cellular networks, but the optimal way would undoubtedly be the use of pagers. In paging systems communication is typically unidirectional, i.e. the pager functions only as a receiver. The pagers are typically also lightweight to be easily carried around anywhere, and the operating time of the device is essentially longer than e.g. a single working shift. These basic requirements of paging are essentially fulfilled by commercial off-the-shelf (COTS) pagers, and some advanced new digital public safety systems already provide an interface, which allows easy integration of such systems to the network.

However, as various two-way mobile speech and text services have become widely available, the competitiveness of the commercial paging systems has diminished, and thus the availability of commercial COTS paging services is constantly decreasing. Furthermore, it is mainly against the agreed public safety security policies to make the rapid activation of operations dependent on the availability and encryption level of commercial communication services. Building up and maintaining a separate paging network merely for public users, on the other hand, induces high additional capital and operational costs that the authorities are not willing to take. In this respect the preferred option would be to implement also the paging service over the secure and resilient network with which the operational public safety communication is managed altogether.

The European Telecommunications Standards Institute (ETSI) has defined a standard for mobile public safety communications, Terrestrial Trunked Radio (TETRA). As a modern digital cellular radio system, TETRA offers two way text messaging service, which can be, and to some extent already is, used for paging as well. However, there is a practical problem that has so far prevented extensive use of TETRA Short Data Service (SDS) as a bearer for paging service.

Network planning is an iterative process during which the coverage is optimised to fulfil the qualitative requirements for the service and at the same time to conform to the pre-set financial limits for investment and operation. The TETRA air interface provides efficient means (direct mode operation, repeaters, gateway repeaters, mobile base stations etc.) to facilitate operative communication even in places of weaker coverage (buildings, tunnels etc.) This leads to the practice that in order to control the costs, the network planning of public safety networks is driven by good quality, continuous outdoor coverage, not that much by the availability of exhaustive indoor coverage. Though operational communication is thus excellently facilitated, for paging service this practice, however, constitutes a drawback.

People off shift spend a lot of their time indoors at home, and it is thus probable that the delivery of the paging message can be considerably delayed because of the low indoor coverage. Even though the requirement on the acceptable period for getting the message through is much more lenient in paging than in operative communication, it is clear that such delays in paging due to inadequate indoor coverage are not acceptable in public safety environment.

Another practical disadvantage in paging over the TETRA SDS is the load incurred on the main control channel by paging. Especially in case of a major incident, the control channel is already highly loaded with signalling related to critical operative communication, and thus major additional load due to paging is not acceptable.

BRIEF DESCRIPTION OF THE INVENTION

It is thus an object of the present invention to provide a method, a system and an apparatus for implementing the method so as to alleviate the above disadvantages. The object of the invention is achieved by a method and an arrangement which are characterized by what is stated in the independent claims. The preferred embodiments of the invention are disclosed in the dependent claims.

The invention is based on the idea of improving the delivery of paging messages by dedicating to delivery a traffic channel with robust data protection, and time-dividing the paging messages to a plurality of terminals into a paging frame that is delivered over the air using said traffic channel. A mobile station in paging mode will monitor the consecutive paging frames and receive the messages addressed to it, either by the individual address or by the address of a group it belongs to.

An advantage of the method and arrangement of the invention is that the probability of successful delivery of paging messages can be remarkably improved even in challenging coverage conditions with an arrangement, which can be implemented without directing substantial new load to the main control channel.

BRIEF DESCRIPTION OF THE DRAWINGS

In the following the invention will be described in greater detail by means of preferred embodiments with reference to the attached drawings, in which

FIG. 3 illustrates the structure of the paging frame 14;

FIG. 4 shows the frame structure used in the preferred embodiment of the TETRA system;

FIG. 5 shows an arrangement for error protection;

FIG. 6 shows a reference configuration of the mobile station according to the invention;

DETAILED DESCRIPTION OF THE INVENTION

Figure 1:
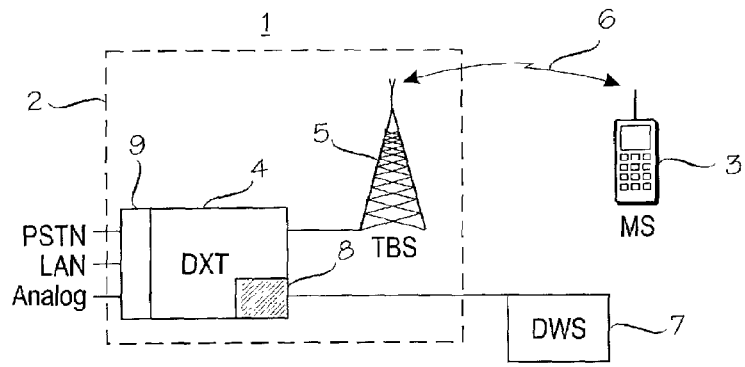
FIG. 1 shows a simplified illustration of the main elements of the invented radio system 1.

FIG. 1 shows a simplified illustration of the main elements of the invented radio system 1. In the following the invention is described using the terms and elements of the TETRA air interface as specified in the European Telecommunication Standards Institute, European Telecommunication Standard ETSI ETS 300 392-2, without limiting the invention to this radio system. The invention can be utilised in any radio system within the scope of claim 1. Examples of such systems are cellular mobile communications systems, such as the GSM (Global System for Mobile communications), or corresponding mobile systems, such as the PCS (Personal Communication System) or the DCS 1800 (Digital Cellular System for 1800 MHz), and third generation mobile systems, such as the UMTS (Universal Mobile Communication System) and the IMT-2000 (International Mobile Telecommunication System 2000). The invention can also be applied to fixed systems, e.g. to the PSTN (Public Switched Telephone Network), local area networks, wide area networks etc.

The radio system 1 comprises a switching and management infrastructure (SwMI) 2 and a mobile station (MS) 3. The SwMI is equipment for a voice plus data (V+D) network, which enables the subscriber terminals to communicate with each other. In FIG. 1 the SwMI comprises one digital exchange (DXT) 4 and one base station (TBS) 5, but naturally the number of elements and their mutual interconnections may vary according to the implementation. Of the subscriber terminals, the mobile station (MS) 3 is arranged to access the SwMI via the air interface 6. The other type of subscriber terminals, the dispatching workstation 7, communicates with the SwMI through a dispatching interface 8, which can provide the connection using for example E1, ISDN BA, or IP protocols. In practice the radio system can comprise a multiplicity of dispatching workstations 7 and corresponding interfaces 8 of different type. Additionally, the SwMI comprises an interface 9 for interconnection with other networks, such as PSTN, GSM, WCDMA, conventional analog networks, LAN, WAN, and similar. The protocols related to different interfaces are implementation specific arrangements familiar from the prior art.

The role of the SwMI 2 is thus to receive a voice or data message from a sending party via any of these interfaces 6, 8, 9 and deliver it to a receiving party. As for paging messages, the sending party, i.e. the paging party, is typically a dispatcher DWS 7 of the system, but can basically be any party capable of communicating with the SwMI. Such comprise, for example, an application connected to the system via LAN or WAN, another mobile station of the system, or even a PSTN or GSM subscriber authorised to do so by the paging application. Correspondingly, the paging messages can basically be forwarded to any party capable of communicating with the SwMI, but the present invention relates to the delivery of paging messages to the mobile stations of the radio system.

The connections of mobile stations to the network over the air, the physical channels, are dynamically reserved for connections either for the whole duration of the connection (circuit switching) or for the duration of the transmission of data packets only (packet switching). In order to meet the requirements of data throughput and error rate of different types of data messaging, the radio system provides a number of logical channels, transmission channels that use one or more physical radio channels or part of a physical radio channel, according to the type of information to be transferred. The logical channels are divided into two main groups: signalling channels and traffic channels. In TETRA, signalling channels carry signalling messages and packet switched user data messages, traffic channels carry coded speech and circuit switched user data. A more complete description of physical channels and logical channels of TETRA can be found in ETSI ETS 300 392-2, clause 8.

Figure 2:
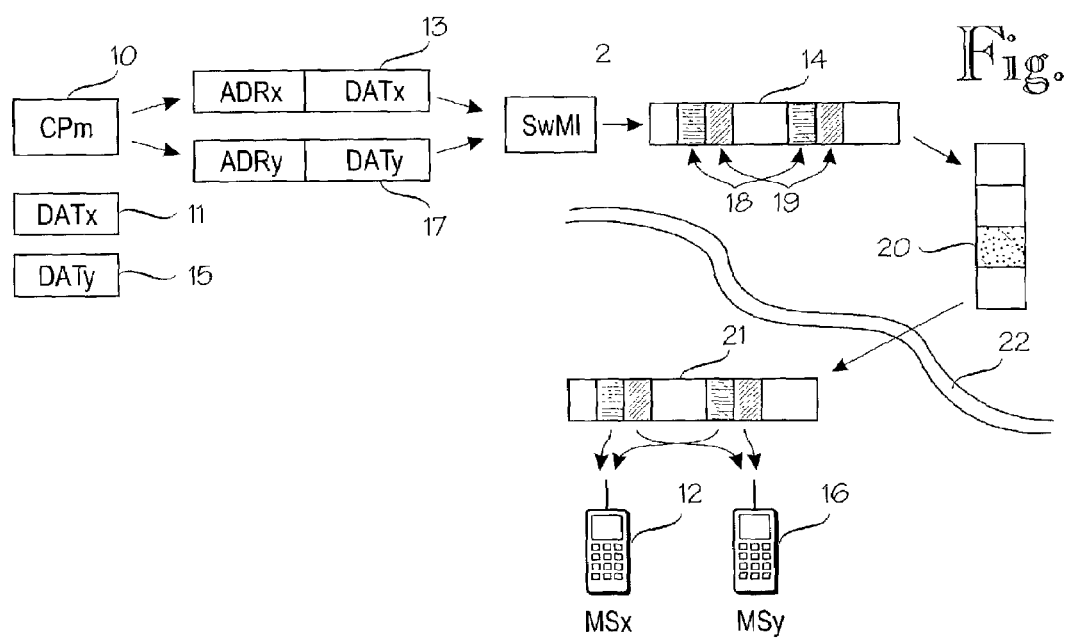
FIG. 2 illustrates the delivery of a paging message in the radio system according to the invention.

The block diagram of FIG. 2 illustrates the delivery of a paging message in the radio system according to the invention. The paging party CPm 10 has a text message DATx 11 that needs to be delivered to the subscriber of a mobile station MSx 12. The paging party CPm 10 can for example be another mobile station, a dispatcher or an application integrated into the radio system. The paging party CPm 10 creates a first paging message 13 that comprises at least the address ADRX of the mobile station MSx 12 to be paged, and the paging data DATx to be delivered to said paged mobile station MSx 12. The first paging message 13 is delivered to the SwMI 2. The communication path of the delivery varies according to the type of the paging party CPm 10, and can take place e.g. over the air interface, E1 connection or via external or internal IP connections. However, said communication path of delivery of paging messages to SwMI 2 is not essential to the invention.

In the radio system according to the invention, the SwMI 2 is able to receive essentially simultaneously a plurality of paging messages from a plurality of paging parties. The SwMI 2 is arranged to combine a plurality of deliverable paging messages into an outgoing paging frame 14. A text message DATy 15 addressed to the mobile station MSy 16 is delivered by the CPm 10 or some other calling party with a second paging message 17 to the SwMI 2. The SwMI 2 arranges the data related to the first paging message 13 into first data blocks 18 of the paging frame 14 and the data related to the second paging message 17 into second data blocks 19 of the paging frame 14.

The SWMI 2 is equipped with a multiplicity of coding schemes COD1, COD2, . . . , CODs and arranged to process data messages for delivery over the air interface with a coding scheme that corresponds to the logical channel used, i.e. the type of the data messages to be delivered. Correspondingly, the SwMI is equipped with a multiplicity of decoding schemes DCOD1, DCOD2, . . . , DCODs and arranged to process data messages received over the air interface with an decoding scheme that corresponds to the logical channel used. Mobile stations operating in the network are equipped with a set of coding and decoding schemes, the set either comprising all the coding and decoding schemes available in the system or a subset of them. Consequently, the SwMI 2 maps the data block or data blocks 18 and 19 related to the mobile stations MSx 12 and MSy 16 correspondingly to the outgoing paging frame 14, and processes the data in said paging frame with a coding scheme CODm that is associated with the logical channel dedicated to delivery of paging messages. The resulting data stream is mapped to a physical channel 20 that is dynamically allocated for the logical channel, and transmitted over the air. Preferably, physical allocations for outgoing paging frames are made when at least one mobile station has informed the SwMI about going to the paging mode. Respectively, the physical channel can be released for other use when there are no mobile stations in paging mode. The mobile stations MSx 12 and MSy 16 are arranged to receive transmissions in said physical channel 20 and process the data in the received paging frame 21 with a decoding scheme DCODm that corresponds with the coding scheme CODm. The coding scheme CODm and the corresponding decoding scheme DCODm are coding schemes that comprise one or more error protection algorithms to provide high data protection for the data delivery. This is to overcome the damping and fading effects on the signal in the radio interface, and especially by a bank 22 of material that interacts with the electromagnetic waves passing through, like a wall of a building, tunnel or equal.

Coding schemes of practically each of the logical channels comprise some kind of mechanisms for controlling transmission errors. In this context the term 'error protection algorithm' refers to a procedure with which errors occurring on a transmission can be managed, for example detected and/or corrected, at the receiving end without requiring retransmission of the data. The choice of the error protection algorithm is essentially based on the probability of the errors in the indoor locations. Appreciating the amount of bits in the paging message and the residual bit error rate estimated for the existing indoor coverage, an appropriate algorithm that provides error protection at a level adequate to the paging application in use can be defined. Typically the error protection schemes require adding of bits to the deliverable messages, and the efficiency of the error protection thus correlates reversely with the transmission efficiency.

An example of error correction coding is FEC (Forward Error Correction), a procedure that comprises transmitting the data in an encoded form such that the redundancy added by the coding allows the decoding to detect and correct errors. Also Bose-Chaudhuri-Hocquenghem (BCH) codes form a large class of powerful error-correcting cyclic block codes. The BCH codes are typically represented in terms of n, k, and t, where k represents the number of information (or data) bits that the code transforms into a longer block of n coded bits, and t represents the largest number of incorrect channel bits that the code can correct within each n-sized block. In some cases an adequate level of data protection can also be achieved with use of error detection. For example, if the paging application is adjusted to repeat the paging messages, and the statistical probability of errors in indoor coverage is low enough, it may be possible to detect errors from the received paging message in consecutive paging frames, and choose from them for forwarding the one that potentially has not been detected to comprise errors. In such cases the term 'error protection algorithm' refers to the whole procedure of error detection and choosing a message for forwarding to the paging application. An example of error detection algorithms is the FCS (Frame Check Sequence), cyclic redundancy check sequence derived over an entire frame.

The mobile stations MSx 12 and MSy 16 are arranged to identify and extract the data block or data blocks 18 and 19 relevant to them from the received paging frame 21. FIG. 3 illustrates an example of a paging frame of the invented system facilitating this. The block diagram in FIG. 3 illustrates the structure of the paging frame 14. The paging frame 14 comprises a number of subframes 23, 24, 25, 26, each of which comprises one or more data blocks, preferably of equal length. In the shown example the data block length is 24 bits, and the first subframe 23 comprises one data block SOA 27 that acts as a marker to indicate the beginning of a list of addresses of paged terminals. The SOA is advantageous for example for synchronisation purposes, but not mandatory, especially if the paging frame length is a fixed constant.

The SOA is followed by the second subframe 24 comprising a defined number of address data blocks ADR1, ADR2, . . . , ADRX 28, . . . , ADRn. The address data blocks comprise information to identify a defined subscriber or a defined group of subscribers of the radio system. The third subframe 25 comprises one data block EOA 29, again a marker to indicate the end of the address list. Like the SOA, the EOA 29 is not necessarily needed, especially if the paging frame length is a fixed constant The fourth subframe 26 comprises data blocks CPI1, CPI2, . . . , CPIx 30, . . . , CPIn to indicate the addresses of the calling parties, and data blocks DAT1, DAT2, . . . , DATx 31, . . . , DATn for the actual text messages. A mobile station MSx 12 that receives said paging frame can identify the relevant data in the paging frame by first identifying its address ADRx 28 in the second subframe 24, and thereafter extracting the corresponding data blocks CPIx 30 and DATx from the fourth subframe 26 for its own use 31. For extracting the correct data blocks in the fourth subframe, the frame address, i.e. the location of the calling party data block CPIx 30 and text data block DATx 31 in the fourth subframe preferably correspond with the frame address of the address data block ADRx 28 in the second subframe 24. It is clear that a number of other methods to facilitate extraction of relevant data blocks can be used within the scope of invention.

Traditionally paging in TETRA has been implemented with TETRA SDS service that utilises signalling channels. The coding schemes of TETRA V+D (voice and data) channels have been designed to minimise the probability that an erroneous message is not detected (Probability of Undetected Erroneous Messages, PUEM). Thus due to the primary usage of these logical channels, powerful error detection and error correction coding schemes are applied in the data message delivery, and corrupted messages are discarded in order to avoid erroneous state transitions. The average indoor coverage of TETRA networks being typically quite low means a high probability of errors in the data received by mobile stations located indoors (e.g. at home). In such conditions a substantial part of the messages is either not received or will end up discarded due to corruptions at the terminal end.

An extensive description of TETRA coding schemes is provided in the ETSI ETS 300 392-2, clause 8. The performance of TETRA traffic channels, except TCH/S, is essentially measured in BER (bit error rate). Due to the particular design of the TCH/S logical channel, there are measurements available for speech transmission in terms of both MER and residual BER, meaning the BER detected in speech frames that are not discarded. Chapter 4 of ETSI Technical Report ETR 300-2 "Terrestrial Trunked Radio (TETRA); Voice plus Data (V+D); Designer's Guide; Part 2: Radio channels, network protocols and service performance" shows evaluations through computer simulations for a number of propagation environments. Comparing the graphs of the residual BER of the TCH/S and the BER of traffic channel for circuit data transfer TCH/2,4 N=8, the difference between the signal-to-noise ratios at the 1E-2 BER level can reach approximately 12 dB and at the 1 E-3 level approximately 10 dB. The radio system of the invention proposes a solution to utilise this difference to improve the reception of paging messages. It is appreciated that even though the signal level as such is essentially inadequate to facilitate operative speech communication or to allow for transmission of short data messages, the coding scheme of high data protection, e.g. like the one associated with the TETRA TCH/2,4 N=8 logical channel, will provide adequate resilience to facilitate remarkably improved delivery of paging messages to subscribers in indoor locations.

In the preferred embodiment of the invention, the paging is arranged as described in connection with FIGS. 2 and 3 to a traffic channel TCH/2,4 N=8, which is originally specified for TETRA circuit switched data transmission. Another important advantage of the solution is the use of existing logical channel, which enables utilisation of normal call setup procedures as specified in the TETRA standard and is thus a very favourable solution from the point of view of terminal interoperability.

The block diagram of FIG. 4 shows the frame structure used in the preferred embodiment of the TETRA system. The length of the markers and address data blocks is adjusted to 24 bits, which coincides with the specified lengths of TETRA short subscriber identities, the individual address of a subscriber (e.g. TETRA individual short subscriber identity (ISSI)), and the address of a user group (e.g. TETRA group short subscriber identity (GSSI)). The paging frame length has been set to equal 10 TETRA multiframes, one multiframe being comprised of 18 TETRA TDMA frames. This will accommodate paging addressed to 333 mobile stations in one paging frame. It is clear to a person skilled in the art that the lengths of the fields and the paging frame can be freely adjusted within the scope of the invention. Additionally it is clear that though the number of paging messages is inherently limited by the size of the paging frame, the paging capacity can be dynamically adjusted by adjusting the number of paging frames in use and allocating a separate traffic channel to each paging frame. This is an additional advantage of the solution, based on the fact that it is considerably easier to manage the capacity with the dynamically allocated traffic channels in the base stations than to operate with the more rigid main control channels, which, furthermore, are critical for the overall operability of the whole system.

To maximise the nominal gain for paging solution, in the preferred embodiment the paging channel TCH/2,4 N=8 can be adjusted to operate in a coverage of even 1E-2 residual BER by adding some error correction coding inside the paging frame. This is managed e.g. by using the 24 bit payload for each data blocks, as in the first preferred embodiment, and enhancing the error control with e.g. an error correcting BCH code (31, 26, 1). The bit chart in FIG. 5 shows the principle of the arrangement. The length of the payload is 24 bits, and the length of each data block of the paging frame is 32 bits. The BCH code length is 5 bits, and thus the arrangement allows the use of two protected flag bits (ff) and one unprotected bit (u) for further error control and synchronisation. However, the BCH code (31, 26, 1) provides correction statistically for one error in every 26 bits and thus with the shown arrangement of data block lengths of 24 bits and the chosen BCH code practically all individual statistical errors in the paging messages would be corrected. In combination with the scattering of the more spurious errors due to the high interleaving depth of TCH/2,4 N=8 the possibility of receiving a correct message even in such low coverage is remarkably increased with the invented solution.

If the paging channel is adjusted to operate in a coverage of about 1E-3 residual BER, use of an error detection coding, like FCS (Frame Check Sequence), in combination with a paging application that repeats the paging message in a number of consecutive paging frames can provide sufficient reliability for the delivery of paging messages.

A further advantage arising from the proposed frame structure is the possibility of allowing the mobile station to utilise the sleep mode. The strict requirement of sub-second call setup times in public safety communication eliminates the possibility of allowing the TETRA mobile stations in normal operation to utilise the sleep mode, or at least not to the extent possible with mainstream terminals and traditional paging devices. Since the periods of off-duty are typically longer than those of on-duty, paging devices are, however, expected to provide charging cycles comparable to COTS pagers. In the invented system the terminal can be arranged to utilise the frame structure. A terminal in paging mode will normally monitor the subframe comprising the addresses ADR1, . . . , ADRn of the paged terminals. If the subframe does not comprise an address the mobile station MSx can relate to, i.e. its individual address or an address of a group the MSx is a member of, the mobile station MSx is arranged to go to the sleep mode and activate at the beginning of the next paging frame.

The block diagram in FIG. 6 shows a reference configuration of the mobile station according to the invention. It should be noted that in the light of the invention, the same reference model is applicable to the functionality of the switching and management infrastructure as well, naturally the individual functionalities are separated into different network elements of the SwMI. Since e.g. in TETRA the implementation of the SwMI is not standardised, the implementations of the SwMI typically have a variety of vendor specific differences. However, the basic inventive idea is not dependent on the division of the described functionalities in the switching and management infrastructure.

The mobile terminal 3 comprises a user interface 32 with input means for inputting data by the user of the mobile station and output means for outputting data. Examples of said input means comprise a keypad, a touch screen, a microphone, and equals. Examples of said output means comprise a screen, a touch screen, a loudspeaker, and equals. The user interface is electrically connected to a processing means CP 33 for performing systematic execution of operations upon data. The processing means CP 33 is a central element that essentially comprises an arithmetic logic unit, a number of special registers and control circuits. For example, the functions implemented by the processing means CP 33 in transmission typically comprise: encoding, reordering, interleaving, scrambling, channel multiplexing, burst building. Memory means 34, data medium where computer-readable data or programs, or user data can be stored, is connected to the processing means. In a mobile station the memory means typically comprise memory units that allow for both reading and writing (RAM) and memory whose content can only be read (ROM).

The transceiver unit 35, comprising a transmitter TX 36 and a receiver RX 37 are electrically connected to the processing means 33. The transmitter TX 36 receives a bitstream from the processing means CP 33, and converts it to a radio signal for transmission by the antenna 38. Correspondingly, the radio signals received by the antenna 38 are led to the receiver RX 37, which converts the radio signal into a bitstream that is forwarded for further processing to the processing means CP 33.

In addition to the terminal functions known from the prior art, the mobile station according to the invention is arranged to enter a paging mode. A radio system typically provides a plurality of services, of which the subscriber utilises the ones necessary for the current operative action. In some instances it is necessary for a terminal subscriber, in order to better adapt to the situation in hand, to temporarily disable one subset of services and at the same time enable another subset of services. For example, TETRA specifies a trunking mode where the network is used for transmitting communication, and direct mode where radio units can communicate by using radio frequencies that are not controlled by the network. Typically the modes are exclusive, i.e. the terminal can operate either in one mode or the other. In either mode there are great differences in the functionality of the terminal. The functionality also directly reflects the combination of logical channels the communicating parties can utilise in delivering data messages over the air interface.

In the paging mode the antenna 38 and the receiver RX 37 of the mobile station MS 3 are adjusted to essentially receive downlink transmissions in a defined paging channel. In the memory means 34 there are stored a plurality of decoding schemes DCOD1, DCOD2, . . . , DCODs, of which a defined coding scheme that comprises one or more error correction algorithms for high data protection, for example the scheme for logical channel TCH/2,4 N=8, is used in paging mode by the processing means 33.

As a comparison, in some considerations the idea of integrating a small self-sustainable pager module in to the TETRA terminal has been considered. The traditional paging technology being quite simple, such solution has been evaluated as an inexpensive way to solve the problem at least at the terminal end. However, in addition to the costs related to the still inevitable building of a paging infrastructure, any solution based on changing or adding hardware is complicated in networks with already have a substantial installed base. As can be seen from the previous description, a further advantage of the present invention is that it can be implemented essentially with software without making major, or optimally any changes to the hardware of the system.

The mobile station MS provides several ways for entering the paging mode. With the user interface 32 a subscriber finishing his shift can enter a command to enter the paging mode, and correspondingly enter a command to end the paging mode. As a response to the command from the user interface, the processing means 33 according to the data and software code in the memory means 34 are programmed to initiate necessary signalling messages to inform the SwMI about entering the paging mode, and to adjust the operation to the paging mode as described in the previous paragraph.

Another method is to equip the processing means with a timer and an algorithm and operate them is such a way that after the expiry of the timer the algorithm will initiate the command to enter the paging mode. It is also possible to arrange the processing means 33 to enter the paging mode as a response to a signalling message received from the SwMI.

The processing means 33 according to the data and software code in the memory means 34 are programmed to monitor at least the subframe of the paging frame that comprises the addresses of the paged terminals. As a response to detecting that the subframe comprises an address it relates to, i.e. its individual address or the address of a group it belongs to, the processing means will initiate a defined paging function. An example of said paging function is that after receiving a paging message addressed to it, the mobile station is programmed to initiate signalling for registration and thus inform the SwMI 2 about ending the paging mode. The mobile station can also be programmed to interpret and thus display the paging message as a callback request to the calling party CPIm 10 of the paging message. The traditional response is to alert the user and display the text message in the user interface, using e.g. the screen and the loudspeaker. These are few examples of the possible paging function, it is clear that the function initiated by the received paging message received is not essential to the present invention.

In the preferred embodiment of the invention the processing means 33 according to the data and software code in the memory means 34 are programmed to monitor the received paging frame for the subframe comprising addresses of the paged terminals, and as a response to the subframe not comprising an address it relates to, i.e. its individual address or address of a group it belongs to, to enter a power saving sleep mode. The sleep mode refers to a mode of operation during which the highly energy consumptive functions like transmission and reception are switched off. Preferably the sleep mode automatically ends in the beginning of the next paging frame. The possibility to use sleep mode will remarkably improve the power consumption of the mobile station, a feature which essentially facilitates the use of public safety terminals for paging.

As described earlier, in low coverage the possibility of signalling, e.g. for cell re-selection, is very low. On the other hand, within indoor locations the probability of need for cell re-selection is very small, and in moving it is likely that the subscriber will also pass through areas with a better coverage (out-doors) that facilitate delivery of cell re-selection information using normal signalling channels. Still, in some cases it is possible that the mobile station has registered within the paging channel of one base station, and after moving some time in e.g. an underground tunnel would actually be within reach of a better quality paging channel of a neighbouring base station.

Furthermore, it is generally understood that operation of devices with inadequate EMC protection may suffer from interference when a mobile station is transmitting in the close neighbourhood. This is why the use of mobile phones with two-way communication is typically forbidden or severely restricted in some critical places, like hospitals, computer rooms etc. However, even in such environments a traditional paging device, which essentially only receives messages, is still accepted.

Thus, in another preferred embodiment of the invention the paging frame comprises e.g. directly after the EOA an additional subframe for carrying information about the paging cells of neighbouring base stations. Preferably the mobile station operating in paging mode will receive the information on only the neighbouring cells that utilise the same paging channel. This facilitates independent cell re-selection without uplink communication with the SwMI. Also preferably the terminal will not start cell re-selection actions until the quality of the current paging channel starts to degrade and there is a better paging channel available in the neighbouring base station.

Figure 7:
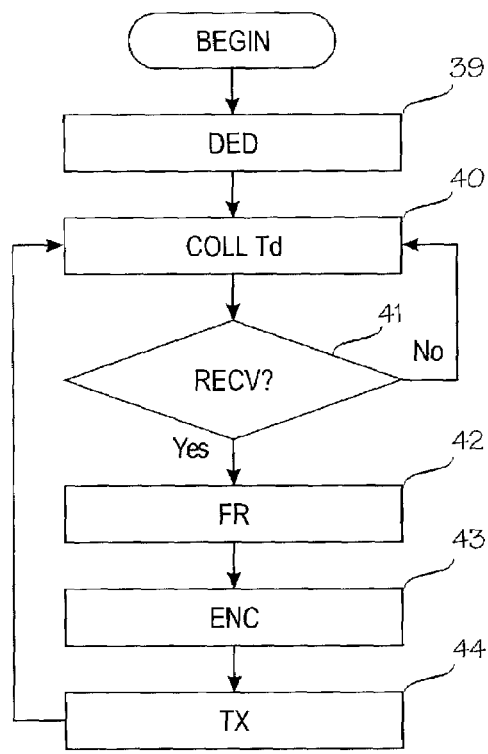
FIG. 7 illustrates the method of delivering paging messages from the point of view of the switching and management infrastructure.

The method of delivering paging messages from the point of view of the switching and management infrastructure is illustrated with the flow chart of FIG. 7. For a more elaborate description of the terms and concepts, reference is made to the description given in connection with the FIG. 2. In step 39, essentially on the introduction of the paging service, a traffic channel dedicated to delivery of paging messages is taken into use. In step 40, essentially in operation, a plurality of paging messages from a plurality of paging parties are received by the SwMI for a time period Td, Td preferably corresponding with the length of the paging frame. Deliverable paging messages, assumed there is at least one paging message received by the SwMI (step 41), are mapped into the paging frame as described in connection with FIG. 3 (step 42). The data in the paging frame is encoded with the robust coding scheme associated with the logical channel dedicated to paging (step 43), and the resulting bursts are mapped into a physical channel and transmitted over the air interface (step 44).

Figure 8:
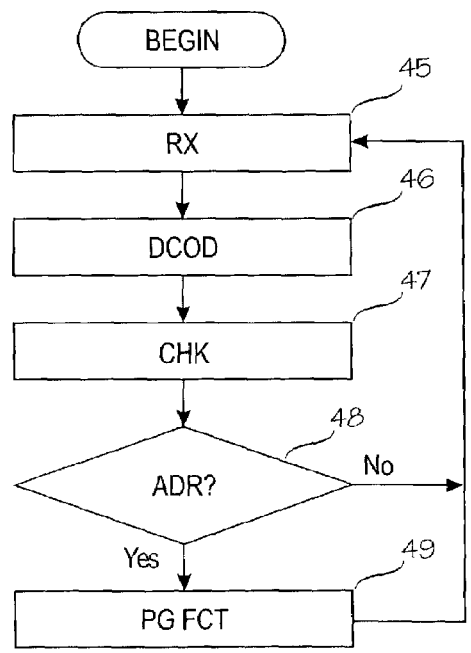
FIG. 8 illustrates the invented method from the point of view of the mobile station.

The flow chart of FIG. 8 illustrates the invented method from the point of view of the mobile station. The mobile station in paging mode receives (step 45) the transmissions in the paging channel and decodes (step 46) the received bursts with the decoding scheme corresponding to the coding scheme used in transmission. The mobile station checks the received paging frame (step 47), and if the decoded data of one paging frame comprises an address data relevant to the mobile station (step 48), the mobile station will implement the pre-defined paging function (step 49) and move over to receiving the next paging frame (step 45). Otherwise it will return directly back to step 45.

It will be obvious to a person skilled in the art that, as the technology advances, the inventive concept can be implemented in various ways. The invention and its embodiments are not limited to the examples described above but may vary within the scope of the claims.

The invention claimed:

1. A radio system, comprising:
   a switching and management infrastructure configured to deliver voice and data between a plurality of communicating parties;
   a mobile station; and
   a multiplicity of traffic channels,
   wherein each traffic channel is associated with a unique coding scheme,
   wherein the switching and management infrastructure is configured to receive a plurality of paging messages from a plurality of communicating parties to a plurality of paged parties,
   wherein the switching and management infrastructure is configured to combine the paging messages received during a pre-defined time period into a paging frame, said paging frame also comprising a multiplicity of address data blocks for identifying the plurality of paged parties to whom the paging messages in the paging frame are addressed,
   wherein the switching and management infrastructure is configured to encode information in the paging frame with the coding scheme of the dedicated traffic channel, and to transmit the encoded paging frame over the air interface in the dedicated traffic channel, and
   wherein the mobile station is configured to receive data on said at least one traffic channel, and to extract information addressed to it based on the address blocks of the paging frame.

2. The radio system according to claim 1, wherein the address data blocks of the paging frame are consecutively arranged into one subframe of the paging frame.

3. The radio system according to claim 1, wherein said address data block is configured to be able to comprise at least one of an individual address of a subscriber or a group address of a group of individual subscribers.

4. The radio system according to claim 1, wherein the frame address of said address data block in the paging frame is configured to indicate the frame address of the corresponding paging message.

5. The radio system according to claim 1, wherein said radio system is a terrestrial trunked radio system and the traffic channel configured to be used in the paging mode is a terrestrial trunked radio traffic channel TCH/2.4 N=8.

6. The radio system according to claim 1, wherein the paging frame is of constant length.

7. The radio system according to claim 6, wherein the length of the paging frame is a multiple of a terrestrial trunked radio multiframe.

8. The radio system according to claim 1, wherein the paging frame comprises cell re-selection data for cell re-selection of the mobile station in the paging mode.

9. The radio system according to claim 1, wherein one paging message is configured to be repeated in at least two consecutive paging frames.

10. A mobile station, comprising:
    a delivery unit configured to deliver voice and data traffic from and to a switching and management infrastructure using a multiplicity of traffic channels, each traffic channel being associated with a unique coding scheme; and
    a receiver unit configured to receive a paging frame on a traffic channel, wherein the traffic channel is dedicated to delivery of downlink paging messages, and is associated with a coding scheme that comprises at least one error protection algorithm for controlling errors in the delivered paging messages, and wherein the paging frame comprises a plurality of paging messages from a plurality of paging parties to a plurality of paged parties received in the switching and management infrastructure during a pre-defined time period, and combined into the paging frame, and a plurality of address data blocks for identifying the plurality of paged parties to whom the paging messages in the paging frame are addressed,
    a decoder unit configured to decode the paging frame with the coding scheme of the dedicated traffic channel;
    a detector unit configured to detect that the decoded data of the paging frame comprises an address data block relevant to the mobile station; and
    an extractor unit configured to extract a paging message addressed to the mobile station from the paging frame.

11. The mobile station according to claim 10, wherein the address block comprises at least one of the individual address of the mobile station, or the address of a group of which the mobile station is a member.

12. The mobile station according to claim 10, further comprising:
    a monitor unit configured to monitor a subframe of the paging frame comprising the consecutively arranged address data blocks; and
    a switcher configured to switch to a power saving sleep mode as a response to not detecting an address relevant to the mobile station in said subframe.

13. A method, comprising:
    dedicating at least one traffic channel of a radio system to delivery of downlink paging messages, said traffic channel being associated with a coding scheme that comprises at least one error protection algorithm for controlling errors in the delivered paging message, wherein said radio system comprises a switching and management infrastructure configured to deliver voice and data between a plurality of communicating parties, a mobile station, and a multiplicity of traffic channels, each traffic channel being associated with a unique coding scheme;
    receiving a plurality of paging messages from a plurality of paging parties to a plurality of paged parties;
    combining the paging messages received during a pre-defined time period into a paging frame, said paging frame also comprising a multiplicity of address data blocks for identifying the plurality of paged parties to whom the paging messages in the paging frame are addressed;
    encoding information of the paging frame with the coding scheme of the dedicated traffic channel; and
    transmitting the coded paging frame over the air interface in the dedicated traffic channel.

14. A switching and management infrastructure element, configured to:
    deliver voice and data between a plurality of mobile stations in a radio system over a multiplicity of traffic channels, wherein each traffic channel is associated with a unique coding scheme;

dedicate at least one traffic channel to delivery of downlink paging messages, said at least one traffic channel associated with a coding scheme that comprises at least one error protection algorithm;

receive a plurality of paging messages from a plurality of communicating parties to a plurality of paged parties;

combine the paging messages received during a predefined time period into a paging frame, said paging frame also comprising a multiplicity of address data blocks for identifying the plurality of paged parties to whom the paging messages in the paging frame are addressed;

encode information in the paging frame with the coding scheme of the dedicated traffic channel; and transmit the encoded paging frame over the air interface in the dedicated traffic channel.

15. A computer program product embodied on a computer-readable medium encoding a computer process of instructions for executing a computer process comprising:

dedicating at least one traffic channel to delivery of downlink paging messages, said traffic channel being associated with a coding scheme that comprises at least one error protection algorithm for controlling errors in the delivered paging message;

receiving a plurality of paging messages from a plurality of paging parties to a plurality of paged parties;

combining the paging messages received during a predefined time period into a paging frame, said paging frame also comprising a multiplicity of address data blocks for identifying the plurality of paged parties to whom the paging messages in the paging frame are addressed;

encoding information of the paging frame with the coding scheme of the dedicated traffic channel; and transmitting the coded paging frame over the air interface in the dedicated traffic channel.

16. A mobile station, comprising:

means for delivering voice and data traffic from and to a switching and management infrastructure using a multiplicity of traffic channels, each traffic channel being associated with a unique coding scheme;

means for receiving a paging frame on a traffic channel, wherein the traffic channel is dedicated to delivery of downlink paging messages and associated with a coding scheme that comprises at least one error protection algorithm for controlling errors in the delivered paging messages, and wherein the paging frame comprises a plurality of paging messages from a plurality of paging parties to a plurality of paged parties, received in the switching and management infrastructure during a predefined time period and combined into the paging frame, and a plurality of address data blocks for identifying the plurality of paged parties to whom the paging messages in the paging frame are addressed;

means for decoding the paging frame with the coding scheme of the dedicated traffic channel;

means for detecting that the decoded data of the paging frame comprises an address data block relevant to the mobile station; and means for extracting a paging message addressed to the mobile station from the paging frame.

* * * * *